(No Model.) 2 Sheets—Sheet 1.

J. SMITH.
CONFECTIONERY MACHINE.

No. 563,330. Patented July 7, 1896.

WITNESSES:
P. F. Nagle.
L. Douville.

INVENTOR
John Smith.
BY
John A. Wiedersheim.
ATTORNEY.

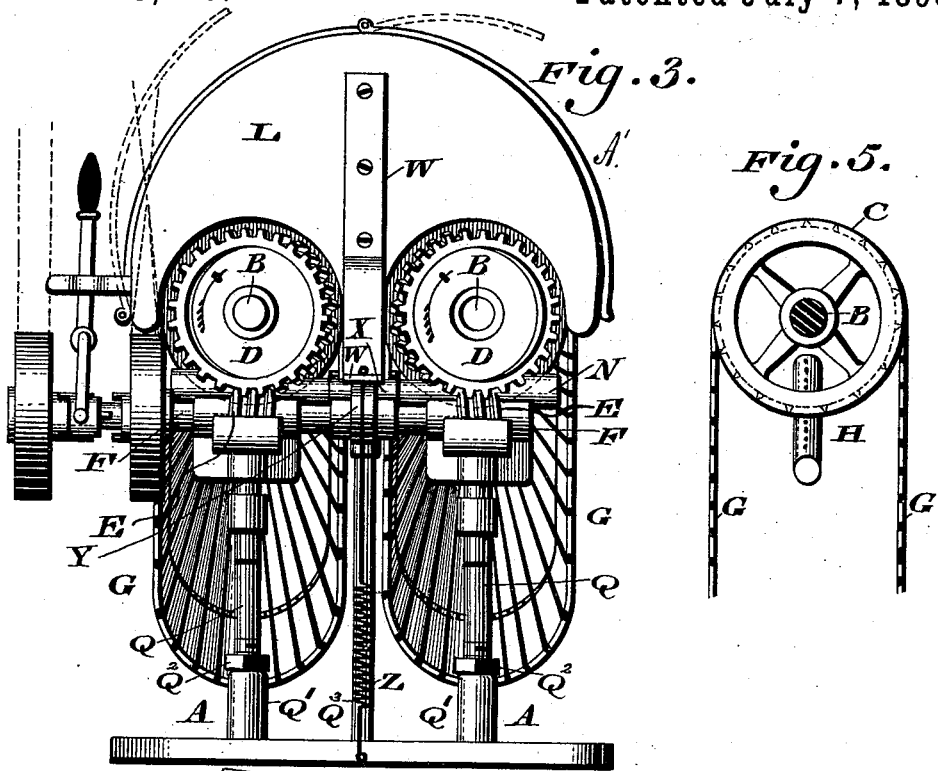
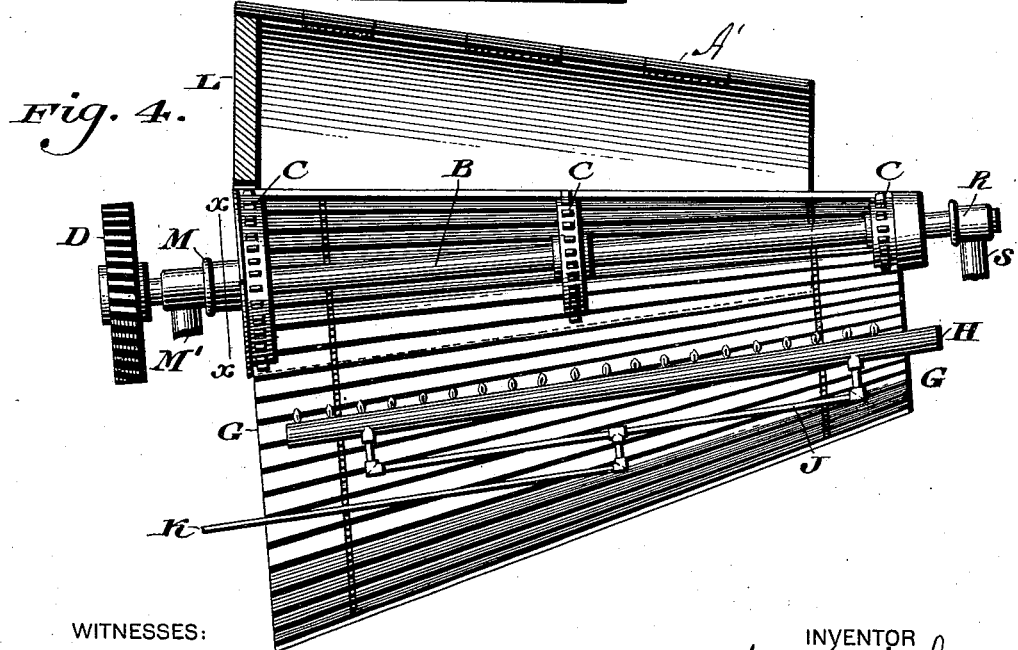

UNITED STATES PATENT OFFICE.

JOHN SMITH, OF PHILADELPHIA, PENNSYLVANIA, ASSIGNOR OF ONE-HALF TO HENRY BRANDLE, OF SAME PLACE.

CONFECTIONERY-MACHINE.

SPECIFICATION forming part of Letters Patent No. 563,330, dated July 7, 1896.

Application filed January 10, 1896. Serial No. 574,949. (No model.)

*To all whom it may concern:*

Be it known that I, JOHN SMITH, a citizen of the United States, residing at Philadelphia, in the county of Philadelphia, State of Pennsylvania, have invented a new and useful Improvement in Confectionery-Machines, which improvement is fully set forth in the following specification and accompanying drawings.

My invention relates to confectionery-machines for making stick candy; and it consists of endless aprons, the slats of which serve to work the candy material into shape for the formation of sticks therefrom.

It also consists in providing the machine with an oscillating bank, against which the candy material abuts, without liability of sticking thereto.

It also consists in providing the aprons with a heating device.

Figure 1:
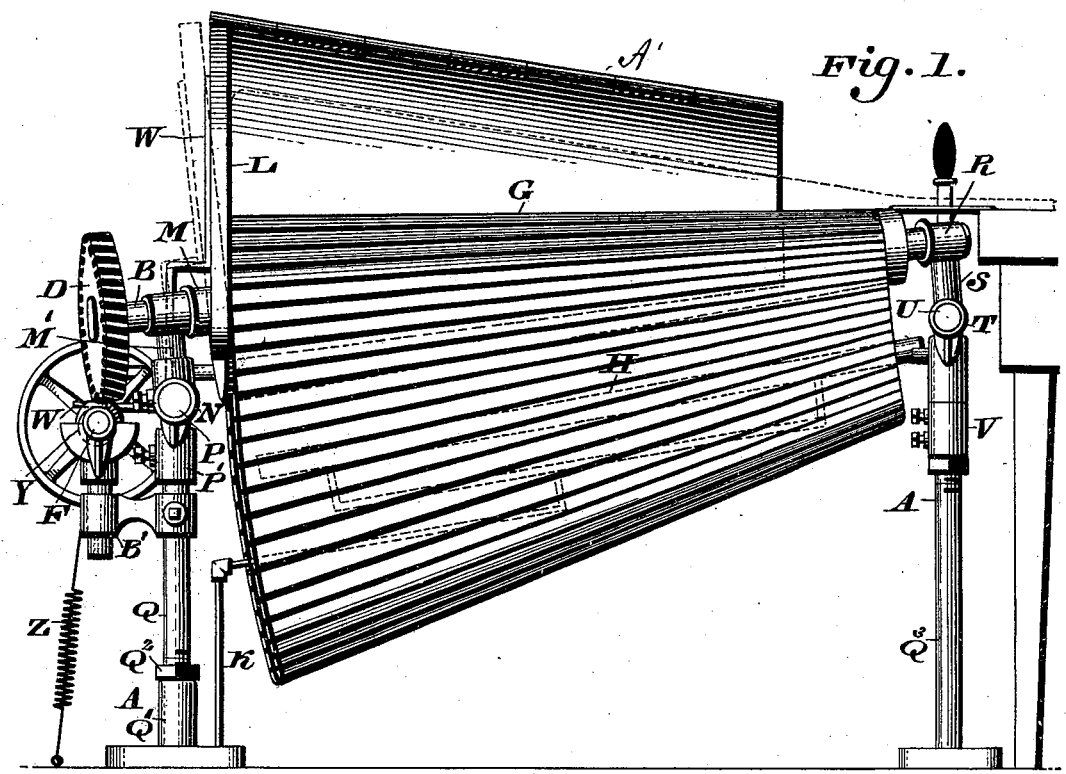
Figure 2:
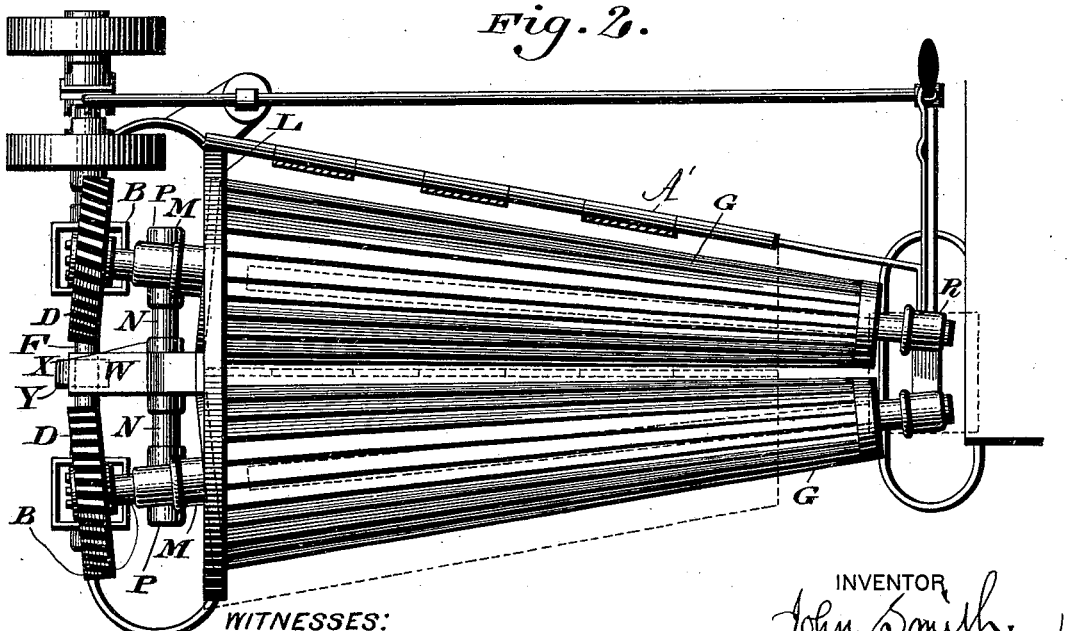

Figure 1 represents a partial side elevation and partial vertical section of a machine for making stick candy embodying my invention. Fig. 2 represents a partial top view and partial horizontal section thereof. Fig. 3 represents an end view thereof. Fig. 4 represents a central vertical section thereof. Fig. 5 represents a section of a portion on line $x\,x$, Fig. 4.

Similar letters of reference indicate corresponding parts in the several figures.

Referring to the drawings, A designates a frame on which are mounted the converging shafts B B, to each of which are secured the sprocket-wheels C.

D designates worm-wheels which are secured to the shafts B and mesh with the worms E, secured to the shaft F, to which latter power is communicated in any suitable manner, whereby the shafts B are rotated in the same direction.

G G designate endless aprons, each of which depends from one set of the sprocket-wheels C, and its slats mesh with said wheels, so that the motion of the shaft is imparted to the aprons. Within the aprons are burner-pipes H, to which are attached the pipes J and K, the latter leading from a supply of gas, so that when the gas is ignited at the pipes H the aprons will be properly heated.

Rising from the frame of the machine, above one end of the aprons, is a bank L, which constitutes an abutment or stop for the mass of candy-forming material placed on the aprons. In order to adjust the level of the aprons, the shafts B at one end have their bearings M secured to uprights M', whose lower ends carry the sleeves N, which are freely mounted on the shaft P, said sleeves forming the bearings for said shaft, having as their supports the collars P', which are freely fitted on the standards Q of the frame A, and thus vertically adjustable thereon. The standards Q are also vertically adjustable on the bases Q' of the frame A and adapted to be retained in position by means of the nuts $Q^2$.

The shafts B at their opposite ends have their bearings R secured to the upright S, whose lower end carries the sleeve T, which forms the bearing for the horizontal shaft U, said sleeve or bearing being supported on the collar V, which is adjustably fitted in the standard $Q^3$ of the frame A.

In order to impart oscillating motions to the bank L, the same has secured to it the bracket W, to which is attached the sleeve X, which is freely mounted on the shaft N and forms the bearing for said bracket on said sleeve. The lower limb of the bracket is engaged by a cam Y, which is secured to the shaft F, so as to be rotated by the same, whereby the bracket may be raised.

Attached to the bracket is the spring Z, which is also attached to the bottom of the frame A, whereby said bracket may be lowered when released from the cam Y. By this provision the bank L is caused to swing forward and backward on the shaft N as its axis, so as to be drawn away at intervals from the candy material, thus preventing the latter from sticking. It will be seen that the aprons are placed side by side, and approach each other at the parts which constitute the tops thereof, forming together a bed on which the candy-forming material is placed, it being evident that when motion is imparted to said aprons they are caused to turn on the sprocket-wheels C, and are thus carried around and around while in their depending conditions, so that the candy material will be worked down and the portion at one end so narrowed or attenuated that when it is removed from the machine it may be readily formed into cylindrical shape as required for stick candy.

While the upper part of the aprons are subjected to the heat of the burners H as the aprons turn and the slats descend and then ascend, they are permitted to cool for a short period, so as to prevent the candy material from sticking to the same, and carried around or beyond the actual heating place.

The aprons are formed of slats connected by chains or other suitable means, producing articulations by which, as the aprons travel around their supports, each slat is successively brought to the top and caused to engage with the candy-forming material, the aprons being of tapering form in longitudinal directions, so that, owing to the same, the working or rolling out of said material will be effectively accomplished.

In order to provide a cover for the aprons, I employ the hood A', which is supported on the frame of the machine and formed in sections, hinged together, so that one section may be opened to uncover one side of the top of the machine, or both sections may be opened to uncover the entire top.

The shaft F, which carries the cam Y and worms E, is mounted on the bracket B', which is adjustably fitted on the standard Q of the frame A, whereby said shaft and connected parts are rendered vertically adjustable, according to requirements.

Having thus described my invention, what I claim as new, and desire to secure by Letters Patent, is—

1. In a machine for manufacturing candy, two rotatable shafts, wheels of different diameters secured to each of said shafts, and a continuous apron pendent from the wheels on each of said shafts, said aprons being of greater width at one end than at the other, said parts being combined substantially as described.

2. In a confectionery-machine, a frame with rotatable shafts mounted thereon, sprocket-wheels of different diameters on said shafts, endless aprons depending from sprocket-wheels and a movable bank above one end of said aprons, said aprons being of greater width at one end than at the other, said parts being combined substantially as described.

3. In a confectionery-machine, a frame, standards thereon vertically adjustable, shafts having bearings vertically adjustable on said standards, mechanism for rotating said shafts, sprocket-wheels on said shafts, endless aprons depending from said sprocket-wheels and heating devices for said aprons, said aprons being of greater width at one end than at the other and forming at their top, a bed, said parts being combined substantially as described.

4. In a confectionery-machine, a frame, standards thereon, one of which is vertically adjustable, rotatable shafts having bearings on said standards, sprocket-wheels of different diameters on each of said shafts, endless aprons depending from the sprocket-wheels of each shaft and of greater width at one end than at the other and heating devices for said aprons, said parts being combined, substantially as described.

5. A confectionery-machine, consisting of a frame, standards thereon, shafts having bearings vertically adjustable on said standards, a driving-shaft having gearing thereon meshing with gearing on said first-mentioned shafts, endless aprons depending from said first-mentioned shaft forming at their top a bed, an oscillating bank at one end and above said aprons, and heating devices for said aprons, said parts being combined substantially as described.

6. In a confectionery-machine, two shafts, each having an end bearing with an upright thereon, each provided with a sleeve at its lower end, a shaft on which said sleeves are mounted, a frame with standards, and collars fitted on said standards and supporting said sleeves, said parts being combined substantially as described.

7. In a machine for making candy, a bed, a bank at one end above the same, a swinging support connected with said bank, a shaft on which said support is mounted, and a cam and spring for imparting motions in opposite direction to said support whereby said bank may be oscillated.

JOHN SMITH.

Witnesses:
JOHN A. WIEDERSHEIM,
R. H. GRAESER.